Patented Dec. 19, 1939

2,183,982

UNITED STATES PATENT OFFICE 2,183,982

MANUFACTURE OF MIXED ESTERS OF CELLULOSE CONTAINING DICARBOXYLIC ACID GROUPS

Loring W. Blanchard, Jr., and Carlton L. Crane, Rochester, N. Y., assignors to Eastman Kodak Company, Rochester, N. Y., a corporation of New Jersey No Drawing. Application July 30, 1938, Serial No. 222,302

6 Claims. (Cl. 260—225)

This invention relates to the preparation of dicarboxylic acid mixed esters of cellulose by reacting upon a lower fatty acid ester of cellulose with a dicarboxylic acid or anhydride in the presence of a solvent and water and bath being free from esterification catalysts and tertiary organic bases.

Previously to facilitate the addition of phthalyl groups, the cellulose acetate used for the starting material has been first hydrolyzed down to a low acetyl content such as approximately 33%. This has necessitated special hydrolysis in addition to that given for ordinary commercial cellulose acetate.

One object of our invention is to provide a process for producing dicarboxylic acid esters of cellulose in which the reaction time is kept at a minimum. Another object of our invention is to provide a process for making esters, such as cellulose acetate phthalate and the like, in which the lower fatty acid ester of cellulose, such as cellulose acetate, employed as the starting material may or may not be hydrolyzed. A still further object of our invention is to provide a process for making dicarboxylic acid esters of cellulose by which the viscosity of the ester is controlled. Other objects of the invention will appear herein.

Our invention involves the preparation of dicarboxylic acid esters of cellulose, such as cellulose acetate phthalate, by reacting upon a lower fatty acid ester of cellulose either hydrolyzed or unhydrolyzed with either the dicarboxylic acid anhydride or the acid itself in the presence of an inert solvent and an amount of water by means of which the reaction is speeded up and the viscosity is controlled. By our process anyone can start with a fully esterified cellulose acetate and obtain a cellulose acetate phthalate having a substantial phthalyl content.

We have found that a mixed ester of cellulose containing dicarboxylic acid radicals may be prepared by reacting upon a lower fatty acid ester of cellulose, such as cellulose acetate, with a dicarboxylic acid anhydride, or the acid itself, in the presence of an inert solvent for the ester prepared therefrom, and sufficient water to control the viscosity as desired. For example, cellulose acetate or a mixed ester such as cellulose acetate butyrate or acetate stearate may be employed as the starting material. The ester may be fully esterified or it may have been partially hydrolyzed. This ester is reacted upon with a dicarboxylic anhydride such as phthalic anhydride in an amount of 10–400% of the weight of the cellulose ester. Instead of the anhydride, the acid may be employed. An inert solvent in sufficient quantity to dissolve the cellulose ester produced and to facilitate the reaction is employed. Also an amount of water 1–50% of the weight of the cellulose acetate is employed. The reaction temperature is preferably within the range 176–302° F. or more providing the temperature is not high enough to have a detrimental effect on the product.

It is preferable that ¼–2 parts of anhydride and 1 part of solvent be used for every part of cellulose ester. Good products for example are obtained using 2–10% of water based on the weight of the cellulose ester (usually acetate) using a temperature of approximately 300° F. and a time of 2–10 hours. The product is separated from the reaction mixture by precipitating with water, for example by slowly pouring the reaction mixture into a large amount of agitated water at a temperature of approximately 70° F. If the reaction mixture is viscous as is generally the case, it is preferable to first dilute the reaction mixture with a mixture of acetone and water. The conditions given above are exemplary and represent conditions and proportions which we have found to be suitable for preparing mixed cellulose esters containing dicarboxylic acid groups.

Ketones are very suitable as solvents. Some of the solvents which are useful are dioxan, acetone and methyl ethyl ketone. Methyl ethyl ketone is preferred because lower operating pressures can be used than with acetone.

Other dicarboxylic acid esters than phthalates can be prepared in accordance with our invention. The corresponding aliphatic dicarboxylic acid compounds such as the anhydrides of succinic acid, maleic acid, malic acid, diglycollic acid or the acids themselves may be employed to prepare cellulose esters containing the radicals of those acids.

The following examples illustrate our invention:

EXAMPLE I 25 lbs. of cellulose acetate having an acetyl content of 33% and a moisture content of 6% was placed in a mixture of 50 lbs. of phthalic anhydride, 60 lbs. of methyl ethyl ketone and 3.75 lbs. of distilled water in an autoclave. The mass was rapidly heated to 300° F. and was maintained at that temperature for 4 hours. The mass was cooled to room temperature and the ester was precipitated therefrom by pouring into water with agitation at 70° F., the volume of water being 10 times the volume of the mass. The product was washed with water that was gradually raised to 140° F. It was then centrifuged and dried. The product, cellulose acetate phthalate was found to have a viscosity of 2.3 centipoises in a 10% solution of ethyl alcohol-acetone (55:45) at 25° C. and a phthalyl content of 23%. The product was soluble in dilute alkali and various organic solvents.

EXAMPLE II 400 parts of cellulose acetate having an acetyl content of 38.3% and a moisture content of 2.4% was placed in an autoclave containing 400 parts of phthalic anhydride, 400 parts of methyl ethyl ketone and 15 parts of water and the mass was maintained at 302° F. for 4 hours. The product was isolated and purified as described in Example I. The cellulose acetate phthalate formed was found to have a viscosity of 21.6 centipoises and a phthalyl content of 21.6%.

EXAMPLE III

The procedure of Example II was duplicated except that 50 parts instead of 15 parts of water was employed. The cellulose acetate phthalate formed was found to have a viscosity of 2.4 centipoises and a phthalyl content of 22.1%.

With many of the uses to which cellulose acetate phthalate or esters of like type are put, such as backing for films and coating compositions it is desirable that the ester exhibit a low viscosity. There are two factors both of which influence the lowering of the viscosity, namely the proportion of water used in the reaction mixture and the phthalic anhydride or acid content of the reaction mixture. With an increase of water in the esterification bath a decrease in the viscosity of the produce is obtained. An increased proportion of phthalic anhydride or phthalic acid, or corresponding dicarboxylic compounds, in the esterification bath results in a decrease of the viscosity of the product obtained. The following data illustrate this variation.

*Cellulose acetate-phthalate prepared from cellulose acetate of 38.3–39% acetyl content*

To show variation in viscosity with the proportion of phthalic anhydride used, the water concentration remaining constant:

| Water (grams) | Phthalyl | Viscosity in alcohol-acetone (55:45) | Cellulose acetate | Phthalic anhydride | Solvent |
|---|---|---|---|---|---|
| | Percent | Centipoises | Grams | | |
| 30 | 10.6 | 50.2 | 400 | 50 | 400 |
| 30 | 18.0 | 11.8 | 400 | 200 | 400 |
| 30 | 23.6 | 5.1 | 400 | 400 | 400 |

To show variation in viscosity in varying water concentration:

| Water (grams) | Phthalyl | Viscosity in alcohol-acetone (55:45) | Cellulose acetate | Phthalic anhydride | Solvent |
|---|---|---|---|---|---|
| | Percent | Centipoises | Grams | | |
| 0 | 11.2 | 82.2 | 400 | 400 | 400 |
| 15 | 21.6 | 21.6 | 400 | 400 | 400 |
| 30 | 23.6 | 5.1 | 400 | 400 | 400 |

*Cellulose acetate phthalate prepared from cellulose acetate of 44.1% acetyl content*

| Water (grams) | Phthalyl | Viscosity | Cellulose acetate | Phthalic anhydride | Solvent |
|---|---|---|---|---|---|
| | Percent | | | | |
| 50 | 25.1 | 5.8 | 400 | 400 | 400 |
| 30 | 17.1 | 13.9 | 400 | 400 | 400 |
| 10 | 8.3 | Insol. (very high) | 400 | 400 | 400 |

The esterification in each case above was run for 4 hrs. at 302° F.

*Cellulose acetate phthalate prepared from cellulose acetate of 33% acetyl content*

| Water (grams) | Phthalyl | Viscosity | Acetate | Anhydride | Solvent |
|---|---|---|---|---|---|
| | Percent | | Pounds | Pounds | Pounds |
| 125 | 30.9 | 5.1 | 25 | 50 | 60 |
| 150 | 33.3 | 3.6 | 25 | 50 | 60 |

The esterifications in the above table were run for 4 hrs. at 302° F.

We have found that in washing the dicarboxylic acid esters of cellulose, such as cellulose acetate phthalate, after its having been precipitated from the esterification bath it is desirable to use both warm and hot water washes. It is preferable that the last washes have the highest temperature used and the first washes have the lowest temperature used.

As an example of a washing operation which may be employed, the cellulose ester after its precipitation and separation from the liquid is treated with the following washes:

1. 3 changes of water at 80° F. The product is stirred and drained almost immediately after its submersion in each bath.
2. 10 changes of water at 105° F. The product is submerged for 5 minutes with stirring. Drained rapidly with suction after each bath.
3. 20 changes at 120° F. Same procedure as in (2).

The product may then be subjected to pressure such as centrifuging to reduce the water content and then dried by means of warm, dry air.

In the preparation of esters in accordance with our invention, the water is added in addition to the moisture content of the cellulose ester starting material. The water used, however, could all be added as moisture content of the ester such as where the cellulose acetate is to be used almost at once it need not be subjected to drying and the addition of water would have to be governed accordingly. The figures given herein are applicable to cellulose acetate having the usual moisture content such as about 2–7%.

As pointed out above various mixed esters of cellulose containing lower fatty acid groups and dicarboxylic acid groups may be prepared by processes in accordance with our invention. Some of the esters which may be prepared are cellulose acetate succinate, cellulose acetate propionate phthalate, cellulose acetate maleate, cellulose acetate diglycollate etc. depending on the lower fatty acid ester of cellulose employed as the starting material and the dicarboxylic acid or anhydride employed to promote the reaction.

It is sufficient that the solvent used be only capable of dissolving the product at the elevated temperatures used in the reaction although it is preferred that it also dissolve the ester at ordinary temperatures as well.

We claim:

1. A process for preparing mixed esters of cellulose containing dicarboxylic acid radicals and lower fatty acid radicals which comprises reacting upon a lower fatty acid ester of cellulose with a bath essentially consisting of a dicarboxylic acid compound selected from the group consisting of the dicarboxylic acids and their anhydrides, an inert solvent for the mixed ester produced and 2-50% of water, based on the weight of the cellulose ester employed as the starting material, the water being additional to the 2-7% of moisture usually present in a lower fatty acid ester of cellulose, the bath being free from esterification catalysts and tertiary organic bases.

2. A process for preparing mixed esters of cellulose containing phthalyl groups and lower fatty acid radicals which comprises reacting upon a lower fatty acid ester of cellulose with a bath essentially consisting of phthalic anhydride, an inert solvent for the mixed ester produced and 2-50% of water, based on the weight of the cellulose ester employed as the starting material, the water being additional to the 2-7% of moisture usually present in a lower fatty acid ester of cellulose, the bath being free of esterification catalysts and tertiary organic bases.

3. A process for preparing a cellulose acetate phthalate which comprises reacting upon cellulose acetate with a bath essentially consisting of phthalic anhydride, an inert solvent for the mixed ester produced and 2-50% of water, based on the weight of the cellulose ester employed as the starting material, the water being additional to the 2-7% of moisture usually present in cellulose acetate, the bath being free of esterification catalysts and tertiary organic bases.

4. A process for preparing mixed esters of cellulose containing dicarboxylic acid radicals and lower fatty acid radicals which comprises reacting upon a lower fatty acid ester of cellulose with a bath essentially consisting of a dicarboxylic acid compound selected from the group consisting of the dicarboxylic acids and their anhydrides, a ketone solvent and 2-50% of water, based on the weight of the cellulose ester employed as the starting material, the water being additional to the 2-7% of moisture usually present in a lower fatty acid ester of cellulose, the bath being free from esterification catalysts and tertiary organic bases.

5. A process for preparing a cellulose acetate phthalate which comprises reacting upon cellulose acetate with a bath essentially consisting of phthalic anhydride, a ketone solvent and 2-50% of water, based on the weight of the cellulose ester employed as the starting material, the water being additional to the 2-7% of moisture usually present in cellulose acetate, the bath being free of esterification catalysts and tertiary organic bases.

6. A process for preparing mixed esters of cellulose containing succinyl groups and lower fatty acid radicals which comprises reacting upon a lower fatty acid ester of cellulose with a bath essentially consisting of succinic anhydride, an inert solvent for the mixed ester produced and 2-50% of water, based on the weight of the cellulose ester employed as the starting material, the water being additional to the 2-7% of moisture usually present in a lower fatty acid ester of cellulose, the bath being free of esterification catalysts and tertiary organic bases.

LORING W. BLANCHARD, Jr.
CARLTON L. CRANE.